A. BAIGNÉ.
PNEUMATIC TIRE.
APPLICATION FILED MAR. 6, 1916.
1,198,812.
Patented Sept. 19, 1916.
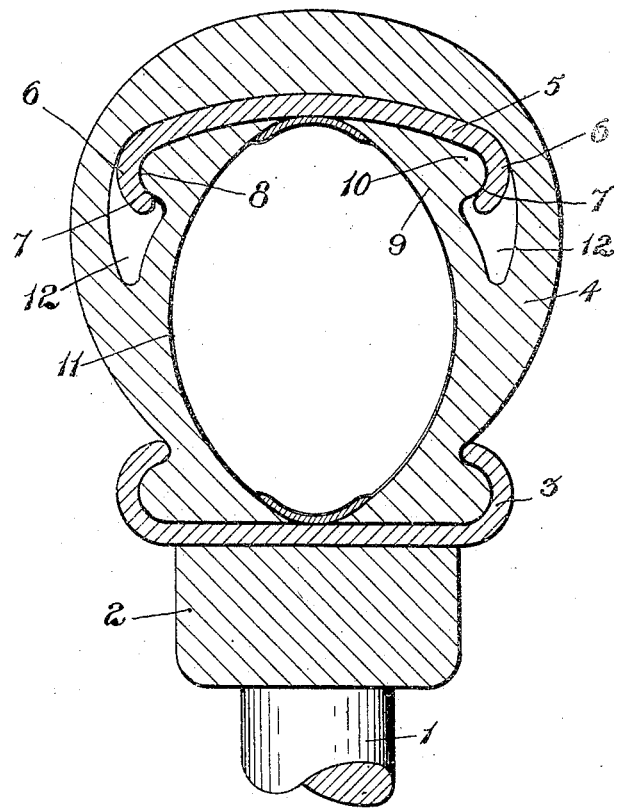
WITNESSES
INVENTOR
A. Baigné
By
Attorney

UNITED STATES PATENT OFFICE.

ADÉLARD BAIGNÉ, OF MONTREAL, QUEBEC, CANADA, ASSIGNOR OF ONE-HALF TO ANNA BRIE, OF MONTREAL, QUEBEC, CANADA.

PNEUMATIC TIRE.

1,198,812.  Specification of Letters Patent.  Patented Sept. 19, 1916.

Application filed March 6, 1916. Serial No. 82,389.

*To all whom it may concern:*

Be it known that I, ADÉLARD BAIGNÉ, a subject of the King of Great Britain, and residing at 439A Beaudry street, in the city of Montreal, in the Province of Quebec, in the Dominion of Canada, have invented certain new and useful Improvements in Pneumatic Tires; and I do hereby declare that the following is a full, clear, and exact description of the same.

The invention relates to a "pneumatic tire" for vehicles as hereinafter fully described with the aid of the accompanying drawings, in which the figure is a cross section through the tire and rim.

The object of the invention is to provide a pneumatic tire in which the inner tube is thoroughly protected from puncture while giving all resilience of the ordinary pneumatic tire.

A further object is to increase the wearing qualities of the tread portion of the tire.

The invention consists in an ordinary tire provided with circumferential grooves integral and within the casing or tire and means provided within said grooves to engage the inwardly curved sides of an annular plate.

Like numerals of reference indicate corresponding parts in the figure.

With reference to the drawings, 1 indicates an ordinary wheel with a felly 2 and 3 is a rim secured to said felly to which the tire 4 according to the invention, is attached.

5 is a circular plate having two side members or flanges 6 inwardly bent at 7, forming a circular recess 8, said circular plate being placed within the tire.

9 are tongues integral with the tire 4 and projecting within said tire and 10 is a boss formed on the inner end of said tongues 9, said boss engaging the circular plate 5.

11 is the inner tube, said tube being preferably bound in canvas, in order to protect it.

It is held that the tongues 9 which are within and integral with the tire and the V-shaped slits 12 formed at each side, give the circular plate a certain amount of play, so that should the tire receive a shock from the side, the circular plate will play within the space allotted therefor and will not damage or injure the casing in any way. The V-shaped slits 12 give the tongues a certain amount of elasticity which will therefore transfer give to the inner tube, an even pressure on one-half of its periphery.

It is believed that the operation of the tire according to the invention will be fully understood from the foregoing description, but it may be mentioned that the resilience is obtained through the compression of the inner tube when the tread member is pressed inwardly at any point, consequent upon the weight of the wheel.

What I claim is:

1. A pneumatic tire comprising a shoe adapted to be attached to a wheel felly, and an annular armor plate in said shoe having a curved inwardly extending flange at each side, said shoe being formed with an annular space arranged radially inside of each flange, whereby the plate may move inwardly.

2. A pneumatic tire comprising a shoe formed with an annular space, which in a transverse section of the shoe appears as a narrow part having an enlargement at each end arranged inwardly of the narrow part, and an armor plate in said space having a lateral flange at each side extending into the corresponding enlargement, whereby the plate may move inwardly without any binding of a flange in the shoe.

Signed at Montreal, Quebec, Canada, this 3rd day of March, 1916.

ADÉLARD BAIGNÉ.

Witnesses:
 D. ROSE,
 C. LEFEBVE.